(12) United States Patent
Gronau

(10) Patent No.: US 11,273,672 B2
(45) Date of Patent: Mar. 15, 2022

(54) METERING DEVICE FOR A SAND-SPREADING SYSTEM OF A RAIL VEHICLE

(71) Applicant: SIEMENS MOBILITY GMBH, Munich (DE)

(72) Inventor: Hans-Joachim Gronau, Vierkirchen (DE)

(73) Assignee: Siemens Mobility GmbH, Munich (DE)

( * ) Notice: Subject to any disclaimer, the term of this patent is extended or adjusted under 35 U.S.C. 154(b) by 246 days.

(21) Appl. No.: 16/500,487

(22) PCT Filed: Dec. 29, 2017

(86) PCT No.: PCT/EP2017/084796
§ 371 (c)(1),
(2) Date: Oct. 3, 2019

(87) PCT Pub. No.: WO2018/184711
PCT Pub. Date: Oct. 11, 2018

(65) Prior Publication Data
US 2021/0107315 A1    Apr. 15, 2021

(30) Foreign Application Priority Data

Apr. 3, 2017  (DE) .................... 10 2017 205 622.3

(51) Int. Cl.
*B60B 39/08* (2006.01)
*B60B 39/02* (2006.01)
*B61C 15/10* (2006.01)

(52) U.S. Cl.
CPC .......... *B60B 39/023* (2013.01); *B60B 39/086* (2013.01); *B61C 15/102* (2013.01); *B60Y 2200/30* (2013.01)

(58) Field of Classification Search
CPC ..... B60B 39/023; B60B 39/086; B60B 39/08; B60B 39/02; B60B 39/021; B60B 39/024;
(Continued)

(56) References Cited

U.S. PATENT DOCUMENTS

| 1,776,688 | A | * | 9/1930 | Pratte ................. B61C 15/102 291/11.1 |
| 2,376,463 | A | * | 5/1945 | Vroman ............... B61C 15/102 291/11.2 |

(Continued)

FOREIGN PATENT DOCUMENTS

| CA | 2748953 A1 | 7/2010 |
| DE | 220863 C | 4/1910 |

(Continued)

OTHER PUBLICATIONS

CNC Turning—APM (Year: 2015).*

*Primary Examiner* — Mark T Le
(74) *Attorney, Agent, or Firm* — Laurence A. Greenberg; Werner H. Stemer; Ralph E. Locher

(57) ABSTRACT

A metering device is configured for fitting into a sand-spreading system of a rail vehicle. The metering device has a housing block, in which a sand path extends from a sand-feeding funnel into a vertical sand blow-out channel via a sand-mixing channel, which rises at an inclination from a sand-holding space to a sand deflection space. A pushing air tube is provided for producing an air flow that conveys spreading sand. The pushing air tube protrudes into the sand-mixing channel coaxially from the bottom. A nozzle insert is detachable inserted into an inflow channel, which leads into the sand deflection space from above. The nozzle insert is provided for producing an air jet directed downward into the sand blow-out channel. The amount of scattering sand that is discharged can be metered more precisely and (Continued)

the susceptibility of the metering device to wear is improved.

12 Claims, 1 Drawing Sheet

(58) Field of Classification Search
CPC ....... B60B 39/04; B61C 15/102; B61C 15/10; B60Y 2200/30
See application file for complete search history.

(56) References Cited

U.S. PATENT DOCUMENTS

| | | | |
|---|---|---|---|
| 3,677,590 A | 7/1972 | Bente | |
| 4,325,573 A * | 4/1982 | Hefter | B61C 15/10 291/3 |
| 5,727,388 A * | 3/1998 | Adamides | B60K 6/00 60/417 |
| 6,976,713 B2 * | 12/2005 | Kish | B61C 15/107 222/72 |
| 2011/0278863 A1 | 11/2011 | Bartling | |
| 2016/0159371 A1 | 6/2016 | Schulte et al. | |
| 2018/0072329 A1 | 3/2018 | Krismanic et al. | |

FOREIGN PATENT DOCUMENTS

| | | | |
|---|---|---|---|
| DE | 1279057 B | 10/1968 | |
| DE | 2146540 A1 | 3/1973 | |
| DE | 2617331 C3 | 10/1981 | |
| DE | 10044608 A1 | 4/2002 | |
| DE | 212006000084 U1 | 9/2008 | |
| EP | 1612117 A1 | 1/2006 | |
| RU | 2446969 C2 | 4/2012 | |
| SU | 604725 A | 4/1978 | |
| WO | WO-2015189771 A1 * | 12/2015 | ........... B61C 15/102 |
| WO | 2016134397 A1 | 9/2016 | |

* cited by examiner

METERING DEVICE FOR A SAND-SPREADING SYSTEM OF A RAIL VEHICLE

BACKGROUND OF THE INVENTION

Field of the Invention

The invention relates to a metering device according to the preamble of the independent patent claim.

A rail vehicle, in particular a locomotive or a motor train unit, has vehicle wheels that can be driven and/or braked. In order to obtain an optimum friction coefficient between the vehicle wheel and the running rail when starting and braking and while the rail vehicle is traveling along, whenever required spreading sand is introduced into the gap between the vehicle wheel and the running rail by means of a sand-spreading system. Such a sand-spreading system comprises a sand box for keeping a store of spreading sand, a metering device fastened to the sand box for compressed-air-controlled metering of the output of spreading sand, and a sand outlet tube, which is connected to the metering device via a sand line and opens out in front of a vehicle wheel.

German Offenlegungsschrift DE 21 46 540 A1 discloses a metering device for a sand-spreading system of a rail vehicle in which the sand path is provided exclusively by boreholes drilled in a housing block. Sand from a sand container arranged above the housing block is supplied by way of boreholes which merge into a downpipe. The downpipe opens out into the cylindrical sand space, which is formed by a slightly inclined borehole. Screwed into its lower end from the outside is a blasting tube, which protrudes coaxially into the sand space. The downpipe opens out a short distance behind the end of the blasting tube into the sand space lying thereunder. A vertical borehole forms the input part of a sand discharging tube. Connected to the housing block is a piece of pipe forming the end part of the sand discharging tube, which merges into an inclined tube part directed onto the vehicle wheel. The transition from the sand space into the perpendicular part of the sand discharging tube, which has the same cross section as the sand space, is formed by a transverse borehole with a greater cross section than the sand space. A further blasting tube is inserted coaxially from above into the sand discharging tube and protrudes into the inclined tube part of the sand discharging tube. In the upper, vertical part of the sand discharging tube, a venting borehole is provided.

The known metering device has great metering tolerances of the amount of spreading sand delivered and is susceptible to wear, in particular with regard to the further blasting tube.

DE 2146 540 A discloses a sand-spreading device for rail vehicles. This has a blasting tube for a pressure medium, the blasting tube protruding coaxially into a cylindrical sand space provided for depositing the falling sand.

U.S. Pat. No. 3,677,590 B discloses a further sand-spreading device, in which sand passes via an input into a sand chamber under its own weight. Through an output and through a following sand tube, the sand is applied in a controlled manner to the rail.

SUMMARY OF THE INVENTION

The invention is therefore based on the object of providing a metering device of the type mentioned at the beginning that allows more precise metering of the amount of spreading sand delivered and at the same time is less susceptible to wear.

The object is achieved according to the invention by a sand stairway of the generic type, with the features specified in the characterizing part of the independent patent claim. Accordingly, a metering device for a sand-spreading system of a rail vehicle has a housing block, in which a sand path extends. The sand path leads from a sand feeding funnel via a sand mixing channel into a vertical sand blowing-out channel. The sand mixing channel rises from a sand receiving space in an inclined manner to a sand deflecting space. The metering device also comprises a pushing air tube, protruding coaxially into the sand mixing channel from below, for producing an air stream conveying spreading sand. According to the invention, in the housing block there extends an inflow channel, which opens out into the sand deflecting space from above and into which a nozzle insert for producing an air jet directed downward into the sand blowing-out channel is detachably fitted. The air jet is directed downward coaxially into the sand blowing-out channel, and thereby produces on the one hand a suction effect due to negative pressure in the sand mixing channel and on the other hand an increase in the volumetric flow of the conveying air in the sand blowing-out channel. Using the nozzle insert has the effect not only of avoiding the bent blasting tube that protrudes into the sand line and is susceptible to wear, but also of creating the possibility of being able to control more precisely the amount of spreading sand delivered through the nozzle insert by means of compressed air.

In an advantageous embodiment of the metering device according to the invention, the nozzle insert is formed as a brass turned part. As a result, precision production of the nozzle insert is possible, with great dimensional stability with regard to its nozzle diameter. The nozzle insert may for example be configured as a cylindrical sleeve and have an axial through-borehole, which defines the precise nozzle diameter. As a result, the air jet is exactly defined with regard to alignment and blasting intensity, which contributes to increasing the precision of metering the delivery of sand. At the upstream end, the sleeve may have a flat, cylindrical neck, which fits into a corresponding recess of the inflow channel. Its shape allows easy fitting of the nozzle insert into the inflow channel and similarly easy removal, so that in the case of the metering device according to the invention a change of the nozzle insert can be performed without any great effort. As a result, a blocked nozzle insert can be quickly replaced by a clean one, or else exchanged for another nozzle insert with a smaller or larger nozzle diameter.

In a preferred refinement of the metering device according to the invention, the nozzle insert can be selected from a set of interchangeable nozzle inserts with differently dimensioned nozzle diameters in accordance with a grain size of the spreading sand used. By providing a set of interchangeable nozzle inserts with different nozzle diameters, the rail vehicle operator can select a nozzle insert that best matches the spreading sand it is using—for example with regard to its average grain size. The easy interchangeability of the nozzle insert also makes this possible without any great effort in terms of the work involved.

In an advantageous refinement of the metering device according to the invention, the sand mixing channel rises at an angle of inclination in the range of 10° to 40°, preferably of 20° to 30°, with respect to the horizontal. The position of the sand mixing channel rising obliquely in the direction of the sand deflecting space has the effect of avoiding large amounts of spreading sand entering the sand blowing-out channel from the sand receiving space in an uncontrolled manner due to vibrations and jerky starting or braking movements of the rail vehicle. This contributes to precise metering of the amount of spreading sand delivered.

In a preferred embodiment of the metering device according to the invention, an outlet portion of the sand feeding funnel opens out into the sand mixing channel from above in the region of a mouth of the pushing air tube. With a given grain size of the spreading sand, the cross-sectional dimensioning of the outlet portion determines the supply of spreading sand on the hourglass principle, that is to say the amount of spreading sand leaving the outlet portion per unit of time. Depending on the position of the mouth of the pushing air tube under the outlet portion, a greater part or less great part of the spreading sand is directly entrained by the air stream of the pushing air tube. A further part of the spreading sand conveyed by the air stream arises from swirled-up spreading sand from the sand receiving space of the sand mixing channel.

In a further advantageous embodiment of the metering device according to the invention, the sand mixing channel is formed by a first cylindrical borehole and the sand blowing-out channel is formed by a second cylindrical borehole in the housing block, with the same diameters. Cylindrical boreholes with the same diameters allow the sand mixing channel and the sand blowing-out channel to be produced in an easy way.

Preferably, the sand deflecting space of the metering device according to the invention is formed by a cylindrical transverse borehole that runs perpendicularly in relation to the sand mixing channel and the sand blowing-out channel and the diameter of which is greater than the diameters of the sand mixing channel and the sand blowing-out channel. A transverse borehole allows the sand deflecting space to be produced in an easy way and to be closed by a suitable closure piece.

The transverse borehole may be set such that the outer generatrices of the sand mixing channel and the sand blowing-out channel merge smoothly into the generated surface of the transverse borehole. As a result, the air stream laden with spreading sand is deflected from the sand mixing channel into the sand blowing-out channel favorably in terms of flow.

In a further preferred refinement of the metering device according to the invention, the pushing air tube is formed as a screw-in part, which is screwed into the first cylindrical borehole from the outside to a predetermined setting depth. As a result, it is possible to dispense with the provision of a set of interchangeable pushing air tubes with different lengths, since the setting depth of the screw-in part can be easily varied by screwing the screw-in part in or out. Depending on the type of spreading sand used, in this way the optimum position of the mouth of the pushing air tube in relation to the outlet portion of the sand feeding funnel can be set. This setting possibility also increases the metering precision of the amount of spreading sand delivered.

In a further advantageous refinement of the metering device according to the invention, the housing block is produced as a one-piece precision casting or 3D printed part. As a result, the housing block 2 with a sand path can be produced with great dimensional accuracy—in particular in comparison with previously used gray iron castings—without any great finishing effort. This in turn improves the metering tolerances of the amounts of spreading sand delivered. If the housing block 2 is produced from high-grade steel, it is even possible to do without separate measures for corrosion protection.

In a further preferred embodiment of the metering device according to the invention, a thermal element for heating spreading sand is integrated in the housing block. The thermal element may be configured in the form of a rod and be arranged in a receiving borehole in the housing block which opens out in the region of the conical portion of the sand feeding funnel. The thermal element may comprise a heating rod, which converts electrical energy into thermal energy. As a result, heated air flows into the spreading sand—possibly assisted by a fed-in supply air stream—through a sintered filter, which prevents spreading sand from the surrounding sand path getting to the heating rod. The spreading sand is dried by the warm air, and is thereby kept in a state in which it can slide and trickle. This improves the meterability of the amount of spreading sand, in particular even during damp weather and at low temperatures.

BRIEF DESCRIPTION OF THE SEVERAL VIEWS OF THE DRAWING

Further properties and advantages of the invention emerge from the following description of a specific exemplary embodiment on the basis of the drawings, in which FIG. 1 schematically illustrates a metering device according to the invention in plan view and FIG. 2 schematically illustrates a longitudinal section through the metering device along the sectional line II-II indicated in FIG. 1.

DESCRIPTION OF THE INVENTION

Figure 1:
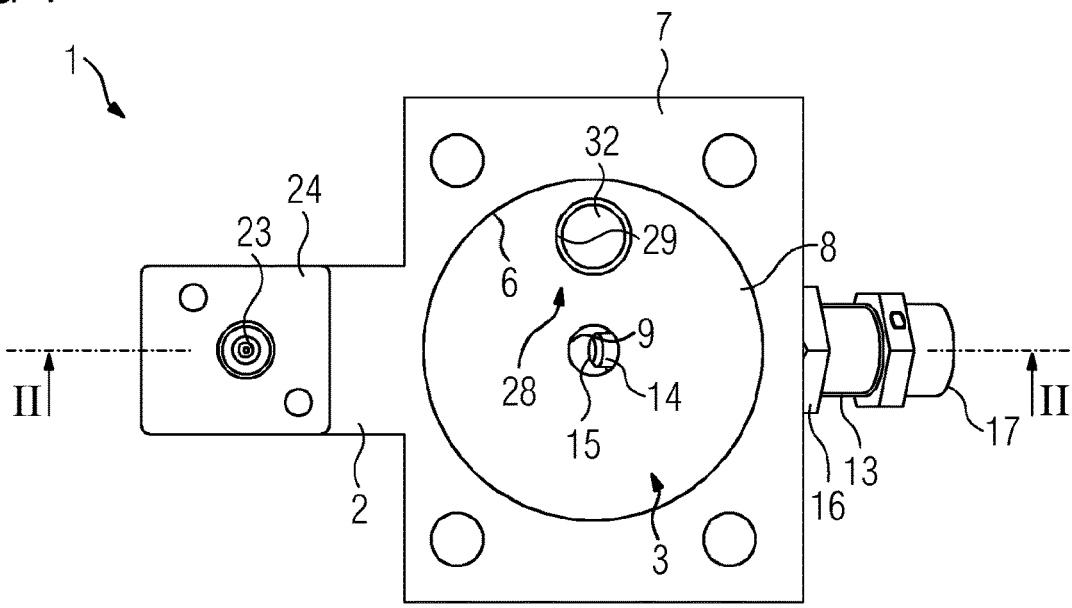
Figure 2:
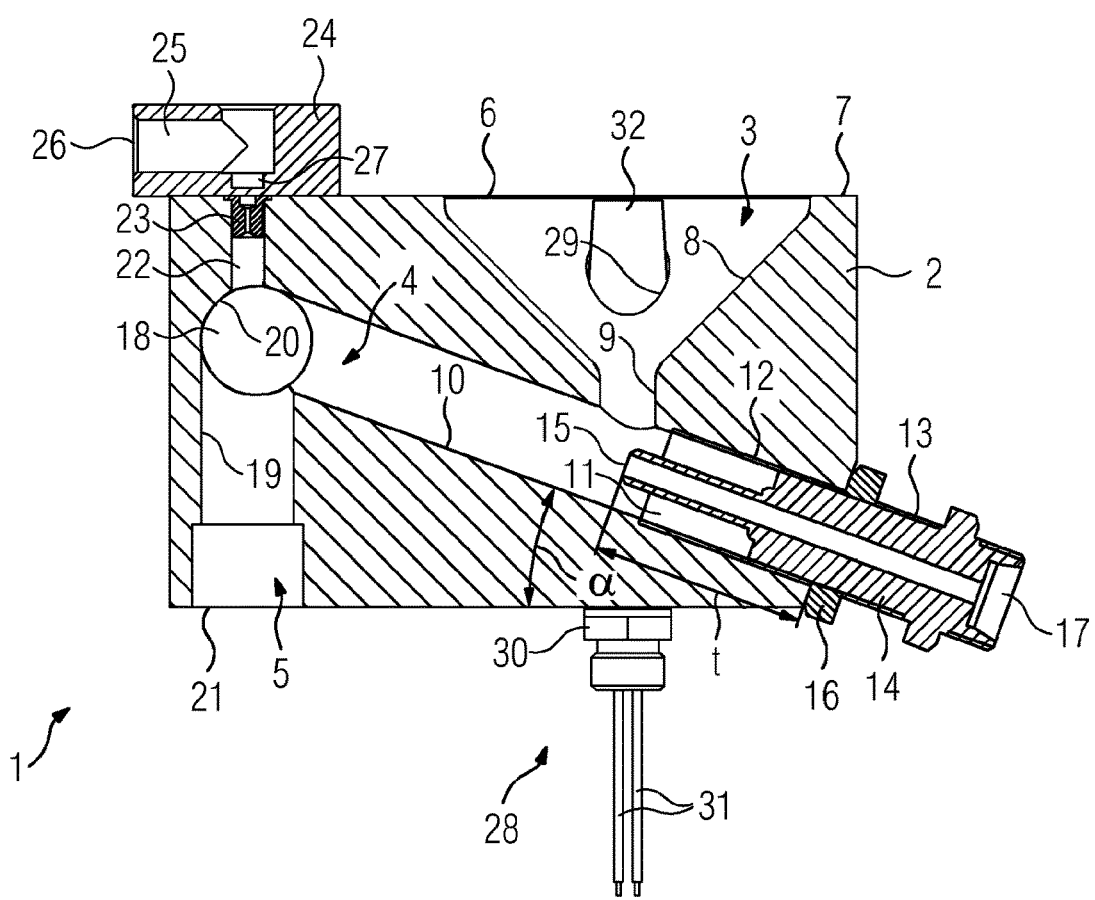

A metering device 1 shown in FIG. 1 and FIG. 2 serves for compressed-air-controlled metering of the spreading sand output of a spreading-sand system that is known per se, and is therefore not represented in its entirety, for a rail vehicle that is likewise not represented. The rail vehicle comprises vehicle wheels that can be driven and/or braked and may for example be a locomotive or a motor train unit. The sand spreading system also includes a sand box for keeping a store of spreading sand which slides into the metering device 1 as a replenishing supply. Spreading sand leaves the metering device 1 through a sand line, which is not represented and in turn is connected to a sand outlet tube that opens out in front of the vehicle wheel in the direction of travel. The metering device 1 comprises a housing block 2, which is formed as a one-piece component, in particular as a precision casting or 3D printed part, the great dimensional stability of which has the effect of avoiding related finishing operations. The housing block 2 may in this case be produced in particular from high-grade steel, as a result of which there is no need for separate measures for corrosion protection. Extending through the housing block 2 is a sand path, which runs from a sand feeding funnel 3 via a sand mixing channel 4, rising in an inclined manner, into a vertical sand blowing-out channel 5. The sand feeding funnel 3 has an inlet opening 6 in a fastening flange 7 of the housing block 2, via which the housing block 2 can be connected to the sand box by means of screw connections. Replenishing spreading sand passes through the inlet opening 6 into a conical portion 8 of the sand feeding funnel 3, which merges into an outlet portion 9 of the sand feeding funnel 3 with a constricted cross section. The outlet portion 9 opens out into the sand mixing channel 4, which is formed by a first cylindrical borehole 10, which is arranged in an inclined manner in the housing block 2. The amount of spreading sand that is fed can be influenced on the hourglass principle by way of the cross-sectional size of the outlet portion 9.

Fed spreading sand collects in a sand receiving space 11, which is formed by the lower end portion of the sand mixing channel 4. Cut into the first borehole 10 is an internal thread 12, which corresponds to an external thread 13 of a screw-in part forming a pushing air tube 14. The first borehole 10 is closed from below by the inserted screw-in part, so that it forms the lower closure of the sand mixing channel 4, and consequently of the sand receiving space 11. The screw connection allows a setting depth t of a mouth 15 of the pushing air tube 14 to be adjusted, and it can be fixed by a counter nut 16 that is adjustable on the external thread 13 of the screw-in part. At its outer end, the screw-in part has a compressed air connection 17 for the connection of a compressed air line that is not represented, in order to produce an air stream for conveying spreading sand through the rising sand mixing channel 4. The setting depth t allows the mouth 15 of the pushing air tube 14 to be positioned in relation to the outlet portion 9, and thereby the conveyed amount of spreading sand to be influenced. In the sand mixing channel 4, the air stream flowing out of the pushing air tube 14 takes up spreading sand, which partly falls directly out of the outlet portion 9 and is partly swirled up from the sand receiving space 11, and conveys it to a sand deflecting space 18 at the upper end of the sand mixing channel 4, in which the air stream laden with spreading sand is deflected downward into the sand blowing-out channel 5. In the exemplary embodiment represented, the sand mixing channel 4 rises at an angle of inclination α of 20° with respect to the horizontal, it being possible to select a value between 10° and 40°, preferably between 20° and 30°, for the angle of inclination α, depending on the spreading sand used.

The sand blowing-out channel 5 is formed by a second cylindrical borehole 19, which extends into the housing block 2 from below and in the exemplary embodiment represented lies in a plane with the first borehole 10 and has the same diameter as it. The sand deflecting space 18 is formed by a transverse borehole 20, which extends through the housing block 2 perpendicularly in relation to the first borehole 10 and in relation to the second borehole 19 and has a greater diameter than them. The transverse borehole 20 extends in such a way that its generated surface forms a smooth transition from the outer generatrix of the sand mixing channel 4 into the outer generatrix of the sand blowing-out channel 5. Provided at the lower end of the sand blowing-out channel 5 is an outlet opening 21, through which the spreading sand leaves the housing block 2 with the conveying air stream, in order to be blown through the sand line connected here into the gap between the vehicle wheel and the running rail to increase the friction coefficient.

For more accurate metering of the amount of spreading sand delivered, the housing block 2 has an inflow channel 22 for an air jet, which opens out into the sand deflecting space 18 from above and is produced by a nozzle insert 23 detachably fitted into the inflow channel 22. The air jet is directed downward coaxially into the sand blowing-out channel 5, and thereby produces on the one hand a suction effect due to negative pressure in the sand mixing channel 4 and on the other hand an increase in the volumetric flow of the conveying air in the sand blowing-out channel 5.

The nozzle insert 23 is preferably configured as a turned part, for instance as a brass turned part, and as a result can be produced with high precision with regard to its nozzle diameter. In the exemplary embodiment represented, the nozzle insert 23 is configured as a cylindrical sleeve and has an axial through-borehole, which defines the precise nozzle diameter. At the downstream end, the through-borehole has a conical depression, while at the upstream end it is drilled out cylindrically and has a flat, cylindrical neck, which fits into a corresponding recess of the inflow channel 22. Its shape allows easy fitting of the nozzle insert 23 into the inflow channel 22 and similarly easy removal, so that in the case of the metering device 1 according to the invention a change of the nozzle insert 23 can be performed without any great effort. As a result, a blocked nozzle insert 23 can be quickly replaced by a clean one, or else exchanged for another nozzle insert 23 with a smaller or larger nozzle diameter. A set of interchangeable nozzle inserts with different nozzle diameters in accordance with the grain size of the spreading sand used is available for this. On the housing block 2, a compressed air flange 24 with a seal in between provides an airtight seal with respect to the compressed air, but is detachably fastened by means of a screw connection. Within the compressed air flange 24, a compressed air channel 25 extends from a connection opening 26 for a compressed air line that is not represented up to an outlet 27, which opens out into the inflow channel 22. Via the compressed air flange 24, compressed air is fed to the nozzle insert 23 and flows through the inflow channel 22 into the sand deflecting space 18 and further into the sand blowing-out channel 5.

A thermal element 28 for heating spreading sand may be integrated in the housing block 2. As a result, the spreading sand is dried and kept in a state in which it can slide and trickle. Integration of the thermal element 28 obviates the need for additional components and associated production and assembly costs. The thermal element 28 is formed as a rod and extends in a receiving borehole 29 running vertically in the housing block 2 and opening out in the conical portion 8 of the sand feeding funnel 3. The thermal element 28 comprises an external hexagonal portion 30 for the engagement of a fastening tool, an external thread portion adjoining thereto for screwing to an internal attachment thread of the receiving borehole 29 and a heating rod adjoining thereto, which converts electrical energy that is fed in through supply lines 31 externally connected at the end face into thermal energy. In the housing block 2 there may be provided a lateral inlet into the receiving borehole 29, through which a supply air stream flows into an annular gap surrounding the heating rod. The air flowing past the heating rod thereby warms up and forms a warm air stream, which flows into the spreading sand to be dried in the sand feeding funnel 3. Arranged at the upper mouth of the receiving bore 29 is a sintered filter 32, which is permeable to the warm air stream but not to spreading sand, whereby blocking of the mouth is avoided. The sintered filter 32 is formed as a truncated cone and protrudes from the generated surface of the conical portion 8 upward into the sand feeding funnel 3. The warm air stream leaving the sintered filter 32 in the upward direction flows counter to the sand feeding direction through the spreading sand in the sand feeding funnel 3 and in the sand box arranged above it. Particularly effective drying of the spreading sand is achieved by this counterflow principle. In addition, the housing block 2 is heated up by the relatively long heating rod and additionally gives off heat to the replenishing spreading sand. The one-piece form of the housing block 2 has the effect that it is also heated up by thermal conduction in the region of the sand receiving space 11, so that the spreading sand located therein is also dried.

The invention claimed is:

1. A metering device for a sand-spreading system of a rail vehicle, the metering device comprising:
    a housing block defining a sand feeding funnel, a sand mixing channel, a sand receiving space, a sand deflecting space and a vertical sand blowing-out channel, said housing block including a sand path extending from said sand feeding funnel into said vertical sand blowing-out channel via said sand mixing channel, said sand mixing channel rising from said sand receiving space in an inclined manner in relation to said sand deflecting space;
    a pushing air tube, protruding coaxially into said sand mixing channel from below, for producing an air stream for conveying spreading sand;
    a nozzle insert; and
    said housing block having an inflow channel opening out into said sand deflecting space from above, said nozzle insert being arranged for producing an air jet directed downward into said sand deflecting space and into said sand blowing-out channel, and wherein said nozzle insert is detachably fitted by insertion into said inflow channel, so that easy insertion of said nozzle insert into said inflow channel and similarly easy removal is allowed, and wherein said nozzle insert can be selected from a set of interchangeable nozzle inserts with differently dimensioned nozzle diameters in accordance with a grain size of the spreading sand used.

2. The metering device according to claim 1, wherein said nozzle insert is a brass turned part.

3. The metering device according to claim 1, wherein said sand mixing channel rises at an angle of inclination in a range of 10° to 40° with respect to a horizontal.

4. The metering device according to claim 1, wherein:
    said pushing air tube has a mouth; and
    said sand feeding funnel has an outlet portion which opens out into said sand mixing channel from above in a region of said mouth of said pushing air tube.

5. The metering device according to claim 1, wherein said sand mixing channel is formed as a first cylindrical borehole and said sand blowing-out channel is formed as a second cylindrical borehole in said housing block, and said first and second cylindrical boreholes having equivalent diameters.

6. The metering device according to claim 5, wherein said sand deflecting space is formed as a cylindrical transverse borehole that runs perpendicularly in relation to said sand mixing channel and said sand blowing-out channel and a diameter of said cylindrical transverse borehole is greater than said diameters of said sand mixing channel and said sand blowing-out channel.

7. The metering device according to claim 5, wherein said pushing air tube is formed as a screw-in part, which is screwed into said first cylindrical borehole from an outside to a predetermined setting depth.

8. The metering device according to claim 1, wherein said housing block is produced as a one-piece precision casting or 3D printed part.

9. The metering device according to claim 1, further comprising a thermal element for heating the spreading sand and being integrated into said housing block.

10. The metering device according to claim 1, wherein said sand mixing channel rises at an angle of inclination in a range of 20° to 30° with respect to a horizontal.

11. The metering device according to claim 1, wherein said nozzle insert is disposed in said inflow channel upstream of said deflecting space.

12. The metering device according to claim 1, wherein an end of said inflow channel is located on an outer side of said housing block, said nozzle insert being fitted into said inflow channel at said end.

* * * * *